May 5, 1964  J. SZYDLOWSKI  3,131,770
FUEL FEED SYSTEMS FOR GAS TURBINES SUCH AS TURBOJET ENGINES
Filed Nov. 16, 1959
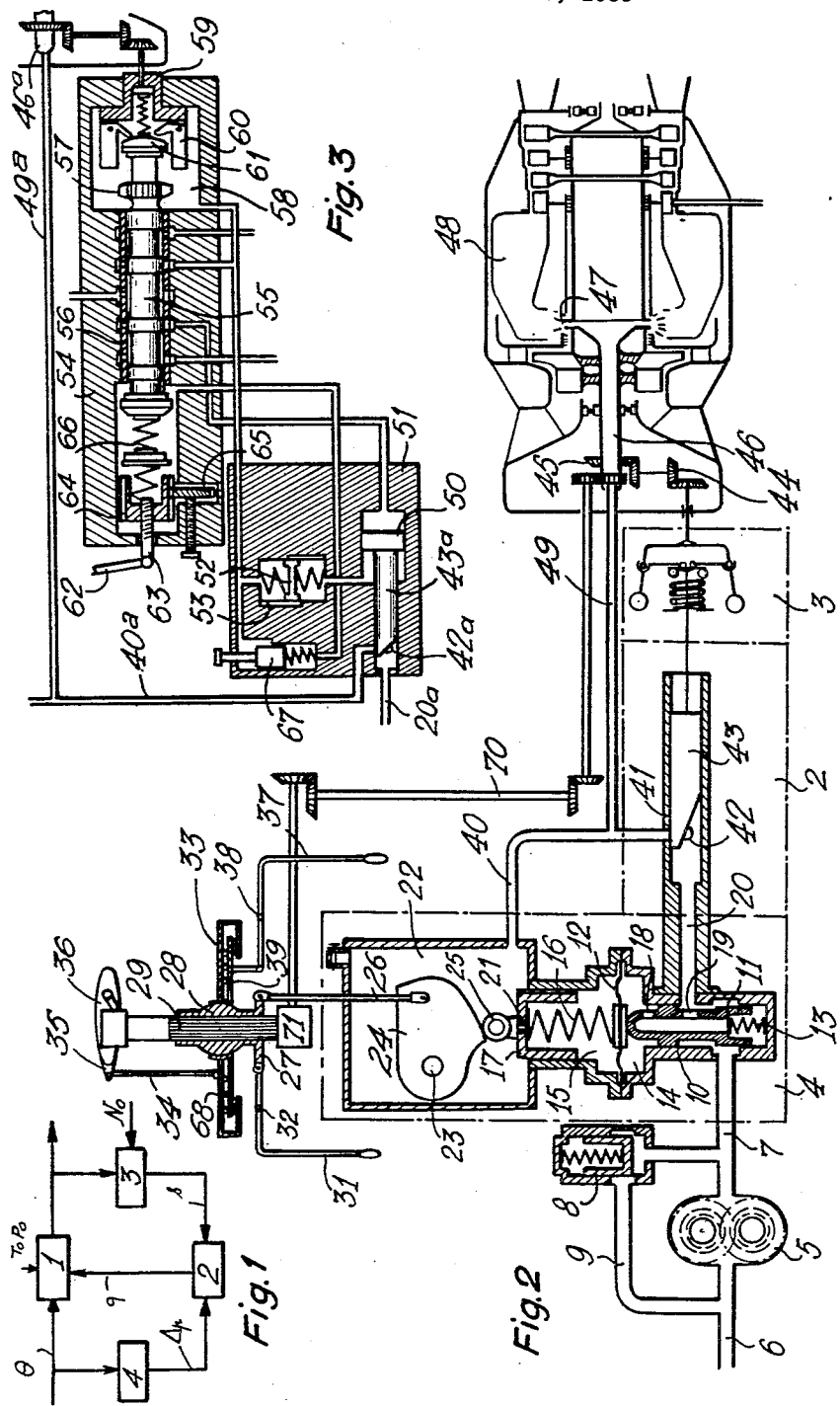

3,131,770
FUEL FEED SYSTEMS FOR GAS TURBINES SUCH
AS TURBOJET ENGINES
Joseph Szydlowski, Usine Turbomeca, Bordes,
Basses Pyrenees, France
Filed Nov. 16, 1959, Ser. No. 853,381
Claims priority, application France Feb. 5, 1959
7 Claims. (Cl. 170—135.74)

The quantity of fuel required to feed a gas turbine so that the latter shall operate at a given r.p.m. and at a given power output can be determined by regulating the fuel flow through a passage of which is possible to vary the flow area $s$ and/or the fuel pressure differential $\Delta p$ across it.

As is well-known, the quantity Q of fuel delivered is given the formula $Q=Ks\sqrt{\Delta p}$, where K is a constant. Thus the quantity Q can be varied by modifying $s$, $\Delta p$, or both.

In the case of a gas turbine driving a machine or a unit the power of which can be modified, regardless of actuation time, by a control member which may be operated manually or otherwise, such as a turbojet engine driving the rotor of an helicopter, at steady working conditions operation generally takes place at a constant rate of revolution. In consequence, for such conditions, regulation can be effected by means of a speed regulator acting, directly or indirectly, upon the flow area $s$ of the passage.

On the contrary, during transient working conditions, when the power of the machine varies with a certain degree of rapidity regardless of actuation time, the rate of rotation will diverge to some extent from the nominal regulated speed and, even if this speed divergence does not involve any major drawback from the standpoint of operation of the driven machine, it is nonetheless by far preferable to restrict the drop in the rate of rotation, when the power is increased, in order to preclude compressor surging in the gas turbine over the normal working range thereof.

This in turn would require a shortening of the response time of the speed regulator, which is unfortunately incompatible with its stability for reasons which depend not upon the regulator design but upon behaviour of the gas turbine, i.e. the response lag in the torque thereof for a given variation in the quantity of fuel supplied.

In order to ensure correct fuel metering in the case of a rapid variation in the power, the present invention has for its object a fuel feed unit for gas turbines driving a machine the power of which can be varied regardless of actuation time by a control member manually or otherwise operated, characterized by the fact that it comprises, between the fuel feeding pump and the gas turbine fuel nozzles, a flow-meter governor having a flow passage which is adjustable in relation to the turbine speed and, upstream of this flow-meter governor, a preregulator for programming in relation to position of the control member modifying the power of the machine.

The adjustment of the adjustable flow passage of the flow-meter governor is preferably effected by the direct or indirect action of a tachometer regulator driven by the turbine. This provides for simultaneous variation in the power and in the quantity of fuel delivered, the tachometer regulator only acting then to complete the preregulation, the accuracy of which can never be absolute.

Since regulation of the speed acts essentially upon the section $s$ of the adjustable flow passage, programming preregulation can act only upon the pressure differential $\Delta p$ which, all other things being equal, will be determined by the power of the driven machine resulting from the position of the control member. If some law be chosen whereby $\Delta p$ is related to this power, then for each value of this power the speed regulator must adjust the section $s$ so that the required quantity of fuel is delivered in each case.

In this case, any variation in the power regardless of the actuation time of the control member will necessarily involve operation of the tachometer regulator.

To avoid this, it is necessary for the gas turbine to receive, for each value of the power output from the driven machine, the quantity of fuel which is required for it to rotate at the nominal speed, the flow cross-section $s$ remaining fixed for this nominal speed. This condition thus fixes the law $\Delta p=f(P)$, relating the pressure differential across the flow section $s$ to the power P of the machine.

To this end, in accordance with the invention, the programming preregulator comprises means for adjusting the fuel pressure differential across the adjustable flow passage in relation to the power-controlling member, this means being associated to a dash-pot type device which ensures the instantaneous variation in this pressure differential in relation to a variation of the power output of the driven machine.

The invention also has for its object industrial applications of the gas-turbine fuel supply unit specified hereinabove, notably in the aeronautical field and more particularly for turbojet engines driving helicopter rotors.

On an helicopter, load changes depend, all other things being equal, upon the rotor general pitch, and it is precisely in the case of a rapid variation of the pitch that it is important for the metering to be efficient.

In this particular case, preregulation is effected as a function of the general pitch $\theta$ of the rotor, the pressure differential $\Delta p$ across the adjustable flow passage $s$ which is maintained constant for the rated speed of rotation being then a function of the general pitch according to the law $\Delta p=f(\theta)$.

It is also easy to show that in altitude, too, operation takes place with a constant value for the adjustable flow passage; for indeed the experimental curves which give, as a function of the general pitch, the fuel flow required for a constant speed of rotation on the ground and at a given altitude respectively, show a constant ratio between the two fuel flows.

Therefore for each value of the general pitch, the respective fuel flows required at different altitudes are obtained by reducing, in a constant proportion, the ground value of adjustable flow passage, by means of the tachometer regulator.

Other particularities of the invention will become apparent from the following description taken with reference to the accompanying drawing given by way of example only and not in any limiting sense, and this description will give a clear understanding of the manner according to which the invention may be carried into practice. In the drawings:

FIG. 1 is a schematic diagram illustrating the complete method of regulating the fuel feed for a gas turbine, in accordance with the invention.

FIG. 2 shows a first embodiment of a gas-turbine fuel feed unit according to the invention, in which the flow-meter governor with adjustable flow passage is directly controlled by a tachometer regulator.

FIG. 3 shows an alternative of the embodiment illustrated in FIG. 2, wherein the flow-meter governor with adjustable flow passage is controlled indirectly by the tachometer regulator through the medium of a hydraulic servo-control.

Although the drawings are concerned with the specific case of an helicopter rotor driven by a turbojet engine, it is obvious that said engine could drive any other machine power of which is modifiable regardless of actuation time by some control member, manually operated or not.

As illustrated in FIG. 1, the assembly 1 consisting of an helicopter rotor and a turbojet engine working at a temperature $T_0$ and pressure $P_0$, is fed with fuel with quantity $q$ of which is regulated by a flow-meter governor 2 having an adjustable flow passage $s$, said passage $s$ being controlled by a speed regulator 3 responsible to the turbojet rated speed $N_0$. The pressure differential $\Delta p$ across this adjustable flow passage is adjusted by a preregulator 4 responsive to the general pitch $\theta$ of the helicopter rotor.

Any change in the load, resulting from a variation in said general pitch $\theta$ under the action of its control, is instantly followed by a variation in the quantity $q$ of fuel delivered so that the turbojet is fed with that quantity of fuel which is needed for it to operate at the rated engine speed.

In the embodiment shown in FIG. 2, a gear-type pump 5 draws in the fuel from a tank (not shown) via a conduit 6 and delivers it into a conduit 7 at a pressure which is regulated by a valve 8 housed in a by-pass 9 connecting the upstream and downstream sides of the pump 5.

The conduit 7 feeds the preregulator. Said preregulator comprises a pressure reducer 10 in which is movable a hollow slide-valve 11 maintained in bearing engagement against a membrane 12 through the medium of a spring 13, this slide-valve closing to some extent the flow of fuel from the conduit 7 to the flow-meter governor 2. In the pressure reducer 10, the membrane 12 forms a partition between two cavities 14 and 15. This membrane is subjected to the reaction of a second spring 16 which bears against the inside of a hollow plunger 17 which travels to and fro inside the body of the pressure reducer 10. The hollow slide-valve 11 is provided with lateral ports 18 and 19 which place it in communication with chamber 14 and with a conduit 20 leading up to the flow-meter governor 2, respectively.

The bottom of the plunger 17 is equipped with a nozzle 21 which establishes communication between the chamber 15 and a chamber 22 in which is pivotally mounted about a spindle 23 a cam 24 acting upon a roller 25 secured to the bottom of the plunger 17.

The cam 24 is connected, via a rod 26, to the general-pitch control plate 27 for the rotor blades of the helicopter. This plate 27, which is integral with a swivel bearing 28 able to travel along splines 29 on the rotor shaft 30, is controlled together with this swivel bearing by a lever 31 which is pivoted at the point 32. The swivel bearing supports the cyclic-pitch swashplate 33 which is connected, via rods 34, to the pitch-variation levers 35 connected with the rotor blades 36. Cyclic pitch control is effected through the medium of a lever 37 pivoted at 38, which acts upon a fixed plate 39 mounted on the cyclic swashplate 33 by means of ball bearings 68, and which causes this rotating swashplate 33 to tilt with respect to the swivel bearing 28.

The chamber 22 is connected to the flow-meter governor 2 by a conduit 40. This governor unit consists of a body 41 provided with a lateral port 42 supplied via the conduit 40 and in which moves a plunger 43 having a whistle-shaped terminal section. This plunger 43 is actuated by the tachometer regulator 3, which is connected by gear trains 44 and 45 to the turbojet rotating shaft 46. Said engine, as shown by way of example, is of the type described in the applicant's U.S. Patent application Ser. No. 386,761 filed October 19, 1953, now Patent No. 2,922,278. The rotary injector nozzles 47 which supply the engine annular combustion chamber 48 are fed with fuel via the hollow revolving shaft 46 through the medium of the conduit 49 connected to the conduit 40. In the manner well-known per se, the turbojet drives the rotor shaft 30 through the medium of a transmission shaft 70 which is coupled to the hollow shaft 46 and ending at a transmission box 71 driving said shaft 30.

At steady working conditions and for a given nominal engine speed corresponding to a value $\theta$ for the general pitch of the helicopter rotor, the flow passage for the port 42 is adjusted by the plunger 43 the position of which depends from the action exerted by the regulator 3 responsive to the turbo-jet rated speed. Simultaneously the upper face of the membrane 12, which communicates with the chamber 22 via the nozzle 21, is subjected to the pressure $p_1$ prevailing downstream of the port 42 of the flow-meter governor and hence also in the supply conduit 49. In the conduit 20 there prevails a pressure $p_1 + \Delta p$, $\Delta p$ being adjusted by the pressure reducer as a function of the position occupied by the cam 24, and this pressure is transmitted to the cavity 14 below the lower face of the membrane 12 via the ports 19 and 18 of the hollow slide-valve 11.

At transient working conditions, when an instantaneous change occurs in the general pitch of the helicopter rotor blades under the action of the plate 27 and the rod 26, the cam 24 pivots about the spindle 23 and causes the plunger 17 to be displaced, say in a direction tending to compress the spring 16. The volume of liquid which is displaced in the cavity 15 by this plunger 17 cannot escape freely into the chamber 22 through the nozzle 21. The upper face of the membrane therefore sustains a pressure in excess of the pressure $p_1$ prevailing in the conduit 49. This in turn tends to increase the degree of aperture of the conduit 7 through action of the hollow slide-valve 11, and hence to accelerate establishment of the rate of flow corresponding to the variation in general pitch. If the plunger 17 were to be displaced in a direction tending to relax the spring 16, the opposite would occur and the degree of aperture of the conduit 7 through the action of slide-valve 11 would tend to be constricted.

If the nozzle 21 were to be replaced by an unobstructed aperture, the pressure differential across the port 42 of the flow-meter governor would not instantaneously follow the position of the general-pitch control lever 31. Thus the unit would embody a time contsant and would be prevented thereby from fulfilling the action required of it.

To summarize, the nozzle 21 functions as the nozzle of a dash-pot and provides for instantaneous obtainment of the relation $\Delta p = f(\theta)$ by selection of an appropriate profile for the cam 24.

Instead of being effected through direct coupling with the tachometer regulator 3, control over the plunger 43 of the flow-meter governor may be obtained through the medium of a hydraulic servo-control system, as shown in FIG. 3.

In the embodiment illustrated in this figure, this servo-control is of the type specified in the applicant's U.S. Patent application Ser. No. 714,798 filed February 12, 1958 now Patent No. 3,002,502. The plunger 43a of the flow-meter governor, which is designed to adjust the adjustable flow passage 42a, which is supplied via the conduit 20a and which supplies the injection conduit 49a ending at the turbojet hollow rotating shaft 46a, is integral with a working piston 50 lodged inside a casing 51. One face of this position 50 is hydraulically connected to a temporary follow-up or isodrome piston 52 associated to slits 53. The other face of the piston 50 is connected to a distributor 54 in which is slidably mounted a slide-valve 55 driven in rotation inside a fixed sheath 56 through the medium of a small oil turbine 57 mounted inside a chamber 58 incorporated in the distributor. A part 59, which is coupled to the rotating hollow shaft 46 through the medium of gear trains, is driven in rotation and carries governor-weights 60 which act upon a dome loosely mounted on the slide-valve 55 via a ball-race.

The pilot transmits the value of the indicated speed of rotation by means of a device of the type described in the applicant's French Patent No. 1,164,684 filed on January 9, 1957 the lever of the first type 62 of this device being pivoted on a threaded part 63 on which is screwed a gearwheel 64 the position of which on this part 63 is manually adjustable by means of a further gearwheel 65. This unit transmits the indicated readings to the other extremity of the slide-valve 55 through the medium of a spring 66.

The connections between the distributor, on the one hand, and the working piston, the isodrome piston and the adjustable laminar compensating valve 67, on the other hand, are as described in said United States patent application Ser. No. 714,798 now Patent No. 3,002,502. Hence they do not call for further description, any more than does the operation of this servo-control system which acts for regulating the actual speed of the engine in relation to the speed indicated by the operator during transient conditions.

What I claim is:

1. A fuel feed unit for a power plant having a gas turbine driving a machine the power of which is modified by a control member independently of the actuation time of said member, comprising, in combination, a fuel feed pump delivering fuel at a determinable pressure, a fuel feed line interconnecting said pump and said gas turbine and having a single adjustable flow passage, means connected to said turbine for adjusting said flow passage in relation to the gas turbine speed independently of said control member to maintain a constant turbine speed, and means disposed upstream of said flow passage in said line, connected to (and controlled by, said control member for adjusting the differential pressure across the thus adjusted flow passage in relation to the position of said control member, whereby, when acting on said control member so that said machine passes from steady to transient working conditions, said differential pressure is instantaneously adjusted in order to obtain the required fuel flow through said flow passage adjusted for said steady working conditions.

2. A fuel feed unit for a power plant having a gas turbine driving a machine the power of which is modified by a control member independently of the actuation time of said member, comprising in combination, a fuel feed pump delivering fuel at a determinable pressure, a fuel feed line interconnecting said pump and said gas turbine, a conventional flow-meter governor having an adjustable flow passage and a plunger for adjusting said flow passage, a tachometer regulator driven by the turbine and independent of said control member, means for connecting said tachometer regulator to said plunger, whereby said flow passage is adjusted in relation to the turbine speed to maintain constant said turbine speed; a programming preregulator connected to said line upstream of said plunger and comprising means connected to, and controlled by, said control member for adjusting the fuel differential pressure across the adjustable flow passage and a dash-pot device adapted to insure the instantaneous variation in this differential pressure in relation to a variation of the power output of the driven machine under the action of said control member.

3. A power plant comprising, in combination, a gas turbine, a machine mechanically connected to said gas turbine, a control member for modifying the power of said machine independently of the actuation time of said member, a fuel feed pump delivering fuel at a determinable pressure, a fuel feed line interconnecting said pump and said gas turbine and having an adjustable flow passage, means connected to said turbine for adjusting said flow passage in relation to the gas turbine speed independently of said control member to maintain a constant turbine speed, a pressure reducer including a slide-valve slidably movable across the fuel line upstream of said adjustable flow passage to adjust the sectional area of fuel flow between the fuel pump and said adjustable flow passage, a membrane, and a resilient device urging said slide-valve into bearing engagement with said membrane, a plunger, a spring interposed between said membrane and said plunger, a nozzle in the plunger bottom, a hydraulic chamber inside which said plunger moves, a line connecting said hydraulic chamber to the fuel line downstream of said adjustable flow passage, and a device connected to the control member of the driven machine, responsive to changes in the position of said control member and acting on said plunger against said spring.

4. A power plant for an helicopter comprising, in combination, a rotor having variable pitch blades, a gas turbine, means for connecting said turbine to said rotor in order to drive the latter, a general-pitch control plate connected to said blades in order to modify the general pitch of said blades independently of the actuation time of said plate, a fuel feed pump delivering fuel at a determinable pressure, a fuel feed line interconnecting said pump and said gas turbine and having an adjustable flow passage, conventional means connected to said turbine for adjusting said flow passage in relation to the gas turbine speed independently of said control member to maintain a constant turbine speed, a pressure reducer having a slide-valve slidably movable across the fuel line upstream of said adjustable flow passage in order to adjust the sectional area of fuel flow between the fuel pump and said adjustable flow passage, a membrane and a resilient device maintaining said slide-valve in bearing engagement with said membrane; a plunger, a spring interposed between said membrane and said plunger, the plunger having a nozzle in the bottom thereof, a hydraulic chamber inside which said plunger moves, a line connecting said hydraulic chamber to the fuel line downstream of said adjustable flow passage, a cam bearing on said plunger and an interconnecting member between said cam and said general-pitch control plate.

5. A fuel feed unit, according to claim 3, wherein the means for connecting the tachometer regulator to the plunger comprises a hydraulic servo-control system adapted for regulating under transient conditions the actual speed of the engine in relation to the speed indicated by the operator.

6. A fuel feed unit, according to claim 5, wherein the hydraulic servo-control system comprises a pump delivering liquid under pressure, a servo-control piston mechanically linked to the plunger, a follow-up piston having two faces hydraulically connected to said servo-control piston, a line interconnecting the two-faces of said follow-up piston, a valve in said line and having an adjustable restricted orifice providing a laminar flow, and a slide-valve having ends which are respectively connected to the tachometer regulator and to the device for indicating the desired speed, said slide-valve being hydraulically connected to said pump, servo-control piston and follow-up piston to supply the liquid under pressure to one of said pistons with the actual speed of the turbine being unequal to the indicated speed.

7. A fuel feed unit, according to claim 3, wherein, with the gas turbine driving the rotor of an helicopter including a general-pitch control plate which acts as a control member for modifying the power of said rotor independently of its actuation time, the device connected to the general-pitch control plate of the helicopter rotor and adapted for acting on the preregulator plunger comprises a cam bearing on said plunger and an interconnecting member between said cam and said general-pitch control plate whereby the preregulation is achieved in relation to the general pitch of the helicopter rotor.

References Cited in the file of this patent

UNITED STATES PATENTS

| | | |
|---|---|---|
| 2,306,953 | Jung | Dec. 29, 1942 |
| 2,422,808 | Stokes | June 24, 1947 |
| 2,616,507 | Greenland | Nov. 4, 1952 |
| 2,616,508 | Mock | Nov. 4, 1952 |
| 2,664,958 | Dancik | Jan. 5, 1954 |
| 2,802,335 | Skellern | Aug. 13, 1957 |
| 2,957,687 | Chillson et al. | Oct. 25, 1960 |
| 2,961,052 | Smith et al. | Nov. 22, 1960 |
| 2,989,975 | Gartner | June 27, 1961 |
| 3,049,139 | Thompson et al. | Aug. 14, 1962 |

FOREIGN PATENTS

| | | |
|---|---|---|
| 785,803 | Great Britain | Nov. 6, 1957 |